United States Patent [19]
Pinzarrone et al.

[11] Patent Number: 5,956,158
[45] Date of Patent: Sep. 21, 1999

[54] SCANNER POWERED BY PERIPHERAL BUS

[75] Inventors: Joseph Pinzarrone, Montara; David McVicar, El Dorado; Sergio Maggi, San Mateo; David Wegmuller, Union City; Emmanuel Reusens, Half Moon Bay, all of Calif.

[73] Assignee: Storm Technology, Inc., Mountain View, Calif.

[21] Appl. No.: 08/829,962

[22] Filed: Apr. 1, 1997

[51] Int. Cl.$^6$ .............................. H04N 1/04; H04N 1/32; H04N 1/46

[52] U.S. Cl. ......................... 358/474; 358/496; 358/442; 358/505; 358/509

[58] Field of Search ..................................... 358/505, 509, 358/475, 498, 496, 494, 474, 473, 409, 412, 483, 486, 488, 442; 250/234–235, 208.1

[56] References Cited

U.S. PATENT DOCUMENTS

| | | | |
|---|---|---|---|
| 4,733,308 | 3/1988 | Nakamura et al. | 358/496 |
| 5,239,387 | 8/1993 | Stein et al. | 358/486 |
| 5,495,347 | 2/1996 | Kim | 358/514 |
| 5,537,229 | 7/1996 | Brandestini et al. | 358/509 |
| 5,612,811 | 3/1997 | Aikawa et al. | 358/509 |
| 5,729,361 | 3/1998 | Suggs et al. | 358/505 |

*Primary Examiner*—Edward L. Coles
*Assistant Examiner*—Cheukfan Lee
*Attorney, Agent, or Firm*—Townsend and Townsend and Crew LLP

[57] ABSTRACT

A scanner powered by the limited power available on a peripheral bus. In particular, the scanner can operate within the 2.2 watts provided over a USB connector. The scanner of the present invention uses a contact image sensor (CIS) which uses optics to distribute light from each light emitter to multiple pixel positions, preferably using a single LED for each color. An electric motor for driving the platen uses rare earth magnets to limit the power required. Instead of the traditional method of biasing the CIS scanner against the platen with a spring, the platen itself is spring-biased. The moveable spring biasing of a platen is possible because a worm drive motor is used allowing a helical thread on the worm drive to contact the platen gears as they move up and down as biased. Preferably, the helical thread of the worm gear has a single point of contact with a gear on the platen, further limiting the friction and allowing the platen to move up and down with respect to the stationary motor. Varied duty cycle digital pulses are used directly to drive the motor. Only the most significant bits are used to limit the amount of circuitry needed to calculate the speed. The digital controller circuit also operates on a 3.3 volt power supply. The platen itself is preferably made of a hard material to limit the footprint of the platen, and a small diameter platen is used.

16 Claims, 8 Drawing Sheets

SCANNER POWERED BY PERIPHERAL BUS

BACKGROUND OF THE INVENTION

The present invention relates to sheet-fed scanners, and in particular to scanners connected by a peripheral bus to a host computer.

A typical sheet-fed scanner includes a roller, or platen, with a resilient, high friction material on the outside of the platen. The platen is rotated by a motor to draw paper into the scanner. The paper is typically moved between the roller and a contact image sensor (CIS). The contact image sensor will typically have a line of LEDs, with different color LEDs for a color scanner. Alternately, fewer or one LED could be used, with an optical element spreading the light to all the pixel positions of a line.

Such a scanner can either connect to a peripheral bus of a host computer, or could be embedded in a computer, such as being embedded in a laptop. A separate power cord will connect to line power or to the computer's line power in the laptop for providing the power needed to drive the scanner's motor, CIS sensor, and other electronics.

A number of other different types of peripheral devices connect to a computer. For example, mice, joysticks, trackballs, touchpads, etc. can be connected to the peripheral port of a computer or embedded in a laptop. For devices which are separate and connect to peripheral port, it is desirable to be able to obtain power over the peripheral bus, rather than requiring a separate power cord. Some devices which use low amounts of power, such as a mouse, can do this. The recently developed universal serial bus (USB), for instance, provides four connectors, two for data and two for power and ground. Power can be obtained from the host computer's 5 volt supply (which is actually 4.5–5.5 volts). However, only 2.2 watts of power are available. A typical scanner, due to the high power requirements of the motor for the platen, and the power requirements of the CIS scanner, typically requires in the neighborhood of 12 watts of power, an order of magnitude higher than the power available over the USB.

SUMMARY OF THE INVENTION

The present invention provides a scanner powered by the limited power available on a peripheral bus. In particular, the scanner of the present invention can operate within the 2.2 watts provided over a USB connector. The present invention is the result of a unique combination of features and unusual tradeoffs.

The scanner of the present invention uses a CIS sensor which uses optics to distribute light from each light emitter to multiple pixel positions, preferably using a single LED for each color. An electric motor for driving the platen uses rare earth magnets to limit the power required. Instead of the traditional method of biasing the CIS scanner against the platen with a spring, the platen itself is spring-biased. The moveable spring biasing of a platen is possible because a worm drive motor is used allowing a helical thread on the worm drive to contact the platen gears as they move up and down as biased.

The spring biasing of the platen, rather than the CIS sensor, eliminates binding, or torque twisting, between the two, thus reducing the torque and required power. Preferably, the helical thread of the worm gear has a single point of contact with a gear on the platen, further limiting the friction and allowing the platen to move up and down with respect to the stationary motor.

Preferably, the control circuitry for the scanner is also configured to limit power consumption with non-obvious tradeoffs. In particular, instead of using a digital-to-analog converter (DAC) to provide a voltage waveform which is turned into the motor drive current by a current buffer in response to digital control signals from a host computer, the digital pulses themselves are used, with their duty cycle being varied and filtered to provide the necessary analog signal. In addition, only the most significant bits for designating the motor speed are used to limit the amount of circuitry needed to calculate the speed. Although this appears to produce an inaccurate speed, because of the feedback, the correct speed is quickly achieved without impairing performance, while allowing a significant reduction in the number of transistors, capacitance, and accordingly the power consumption of the control circuitry.

The digital controller circuit also operates on a 3.3 volt power supply to further reduce power, with the 5 volt power from the host computer being reduced accordingly. Additionally, the sensor drive circuit for the CIS sensor provides different levels of power for different color LEDs, as well as different amounts of time, to even out the intensity of each color and ensure that excess power is not used for any particular color.

The platen itself is preferably made of a harder material than a typical scanner to limit the footprint of the platen on the paper (the amount of the platen in contact with the paper due to compression at the point of contact). This reduces the amount of power required to drive the platen, while at the same time providing sufficient friction to grip the paper when used in combination with the other features of the invention. Additionally, a smaller diameter platen than the prior art is used, preferably less than 15 mm and optimally about 13 mm. This reduces the torque-arm of the platen, further reducing the power consumption of the drive motor.

For a further understanding of the nature and advantages of the invention, reference should be made to the following description taken in conjunction with the accompanying drawings.

DESCRIPTION OF THE PREFERRED EMBODIMENT

Figure 1:
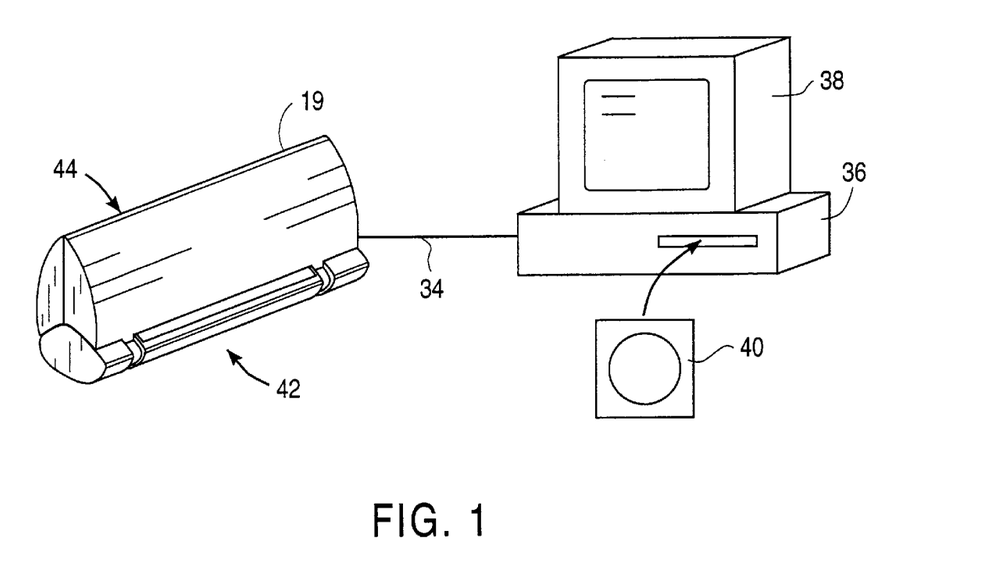
FIG. 1 is a diagram of a computer system incorporating the present invention.

FIG. 1 is a diagram of a computer system including a scanner 19 according to the present invention. The scanner is connected by a bus 34 to a computer 36. The computer 36 includes a monitor 38 and is controlled by software provided on a disk 40. The scanner has a front side 42 for feeding sheets of the paper, and a back side 44 which could also be used for feeding paper, such as by attaching a sheet feeder, if desired.

An alternative embodiment to that shown in FIG. 1 would be for a laptop computer (not shown), in which the scanner would be embedded in the laptop, preferably in front of the keyboard on the laptop. In either embodiment, power could be provided over the peripheral bus 34 either externally or internally to the computer.

Figure 2:
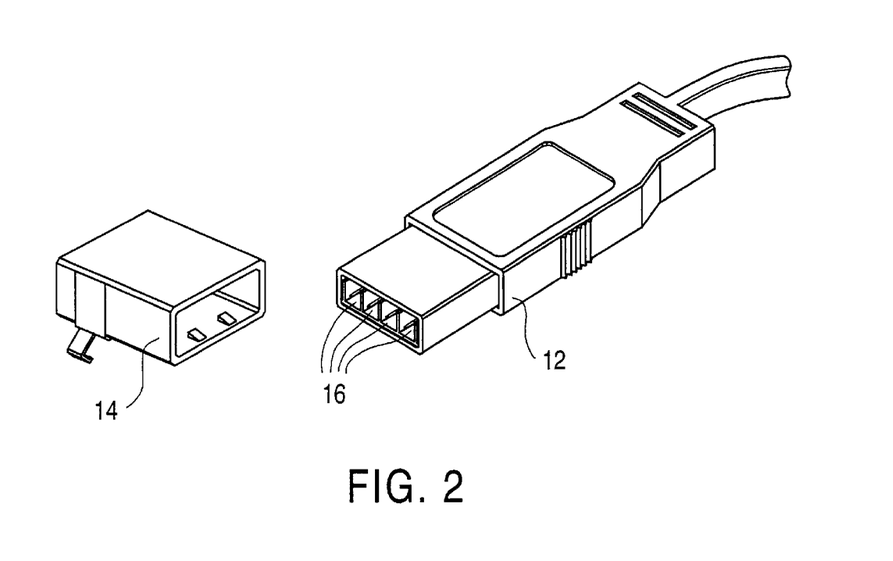
FIG. 2 is a diagram of a USB connector.

FIG. 2 illustrates a connector having parts 12 and 14 for a USB. As shown, the USB includes four conductors which connect to pins 16. Pins 16 include two data pins, and a power and ground pin. The USB is designated to provide 5 volt power at a maximum of 2.2 watts. The data rate is a maximum of 12 mega bits per second.

Although a USE is shown, the present invention can be used with other types of parallel ports providing power. For example, an SCSI port, a game port, or a modified parallel port might be used.

Figure 3:
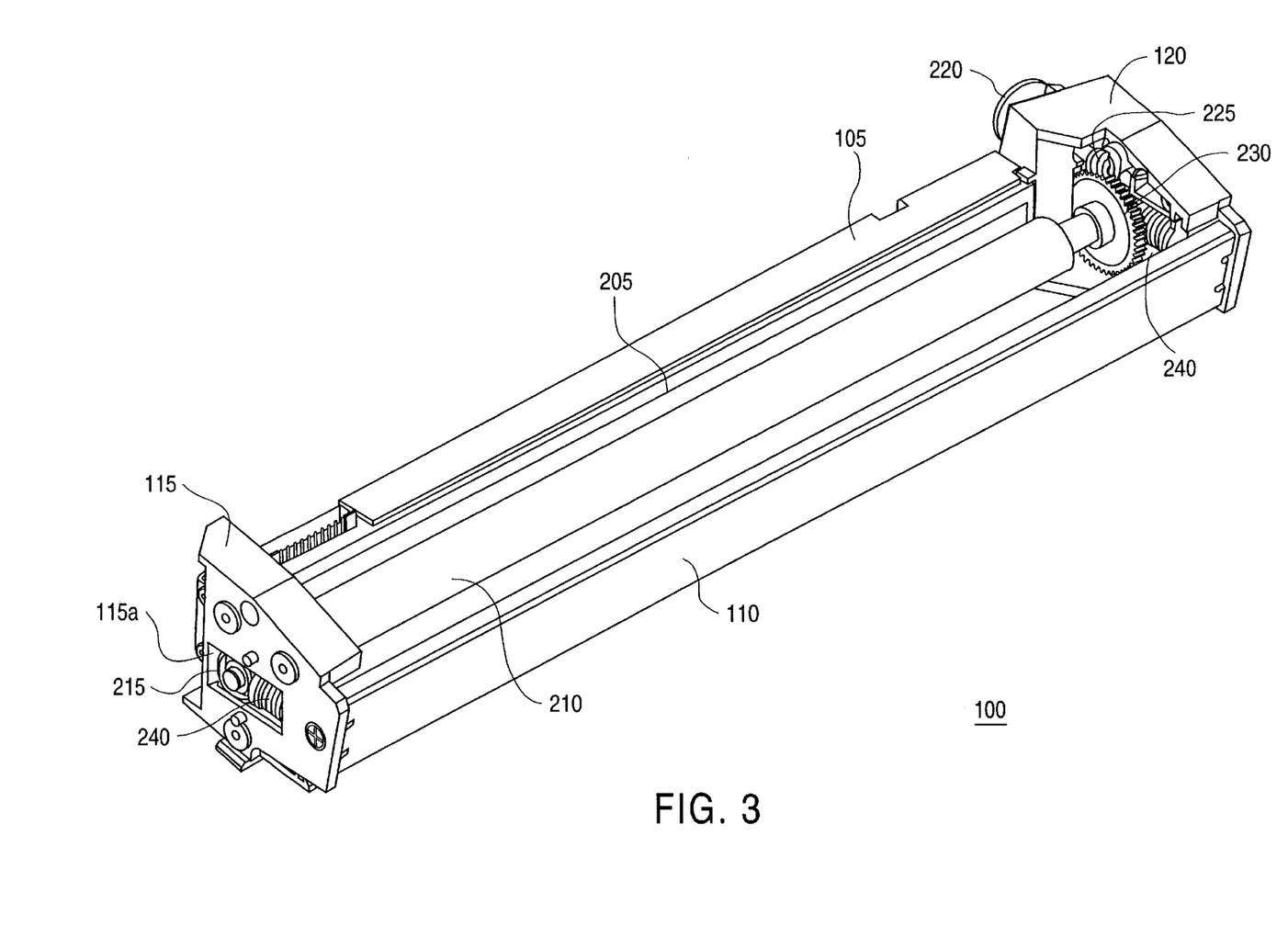
FIG. 3 is a perspective, broken-away view of a portion of a scanner according to the present invention.
Figure 4:
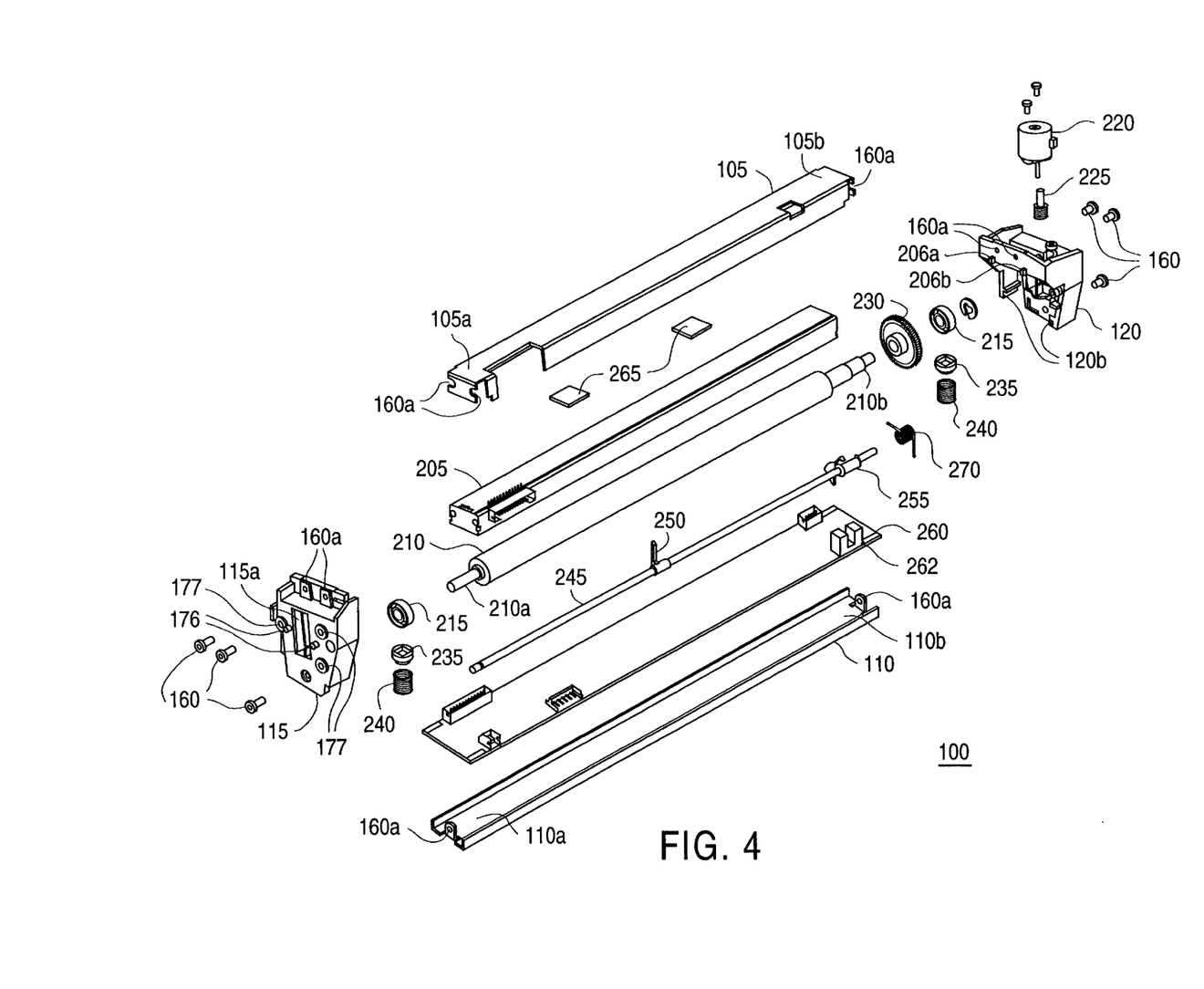
FIG. 4 is a perspective, exploded view of a scanner according to the present invention.
Figure 5:
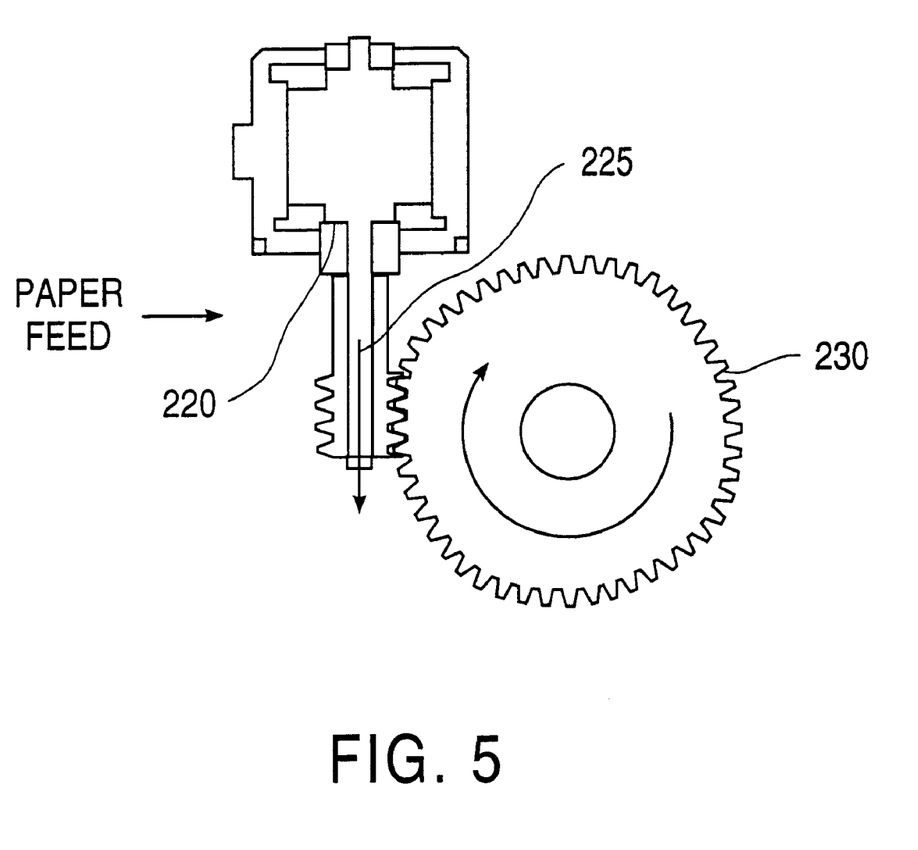
FIG. 5 is a diagram of the worm gear of the present invention.

FIGS. 3–5 illustrate certain mechanical aspects of the scanner according to the present invention necessary to understand the invention. A more detailed description of the mechanical construction of a preferred embodiment is set forth in a copending application entitled "Peripheral Bus Powered Document Scanning Device", filed even date herewith, application Ser. No. 08/831,848, filed Apr. 1, 1997, incorporated herein by reference. A brief description of some aspects of the mechanical construction set forth in that application are necessary to an understanding of this invention, and will be set forth below. For more details, reference should be made to such copending application.

FIG. 3 is a diagram of a partially assembled scanner 100. This partially assembled view exposes the platen 210 and drive gear 230 attached to one end of the platen. Drive gear 230 interfaces with a helical thread on a worm drive gear 225, which is connected to the shaft of a motor 220. The platen is biased up against CIS module 205 by a pair of springs 240. The figure also shows end plates 115, 120, frame members 105 and 110, and a slot 115a within which a bearing 215 is positioned on top of spring 240.

FIG. 4 is a more detailed, exploded view of the scanner of FIG. 3. For a more complete description of the scanner of FIG. 4, reference is made to the above-referenced copending application. A few features will be pointed out here. In particular, a bearing rest 235 is shown between bearing 215 and spring 240. Preferably, bearings 215 are plastic roller bearings which reduce torque and power requirements. Because the worm drive motor itself provides a biasing force against one end of the platen, the invention uses a weaker spring 240 on the end opposite the motor, further reducing the torque on the motor and thus the required power. Preferably, this spring opposite the motor is approximately 30 percent weaker than the other spring.

FIG. 4 also shows a document arm 250 on a bar 245. When the sheet is inserted, this arm member will rotate the bar, which rotates the document flag, which triggers the sensor 262 providing a signal indicating that a sheet is being fed into the scanner to activate the scanner. Only a single document arm is placed in the center of the scanner to ensure that the document, especially documents which are narrower than the scanner, are inserted in the center. This avoids differences in friction and torque due to the sheet being between the roller and the CIS sensor on only one side or the other of the scanner, which would allow a slight twisting of the platen due to the spring force. By requiring that the sheet be fed in the center, this effect is minimized.

FIG. 5 shows another view of motor 220 with its worm drive helical thread gear 225 engaging gear 230 connected to the platen. The use of a worm drive is not an obvious choice for a low power application, because of the relative inefficiency of a worm drive. However, the particular design of the present invention provides for a 48:1 reduction ratio in a very small space to provide an offsetting power reduction. In addition, the design allows gear 230 to move up and down with respect to stationary helical gear 225 as the platen is biased by springs 240 of FIGS. 3 and 4. In particular, as described in more detail in the above-referenced copending application, the teeth of gear 230 and the helical thread of gear 225 are designed so that there is a single point of contact at all times (avoiding multiple points of contact), with the peak of the teeth on gear 230 never reaching the root of the thread on gear 225. Thus, the teeth never jam into the root, and the larger than standard diameter of the tooth on worm 225 ensures that the drive does not disengage. The design thus allows gear 230 to move up and down while maintaining the single point of contact, and the single point of contact limits the frictional losses, thus limiting the power required. As discussed above, the ability to move the platen up and down with respect to the motor allows the platen to be spring biased against the CIS module, rather than vice-versa, thus minimizing any torque twisting or binding effect, with a corresponding reduction in the required power.

Motor 220 is preferably a rare-earth magnet motor which operates on 5 volts and 1 watt of power. The motor is preferably a stepping motor, which preferably provides 20 steps per rotation. The size of the step, the 48:1 reduction, and the diameter of the platen preferably provide a minimal step distance of 1/600 inch. The worm drive is preferably a non-enveloping, single start drive, with a single thread tooth helically wound.

The platen itself is preferably less than 15 mm in diameter, and more preferably approximately 13 mm, or, more exactly, 12.94 mm. Instead of a typical silicon or rubber overmold, a harder rubber overmold with a high durometer rating is used. Preferably, NBR rubber is used having a durometer reading of 85+/−5 DUA, and a coefficient of friction between the roller and the paper of approximately 0.8. The use of a harder roller provides a smaller footprint against the paper when the roller or platen is biased against the CIS module with the paper in-between. The footprint is the amount that the roller is compressed under pressure from the springs, which provides friction and resistance to the turning of the motor, and thus affects the power. By limiting the footprint to a narrow line, the power consumption is reduced. Sufficient friction is still provided to enable the paper to be drawn through the scanner. This design works in conjunction with the other aspects of the design, such as the carefully matched spring forces on the platen. With a harder material, there is less leeway for misalignment or differential forces on the platen if the paper is to be successfully drawn through.

The CIS sensor is preferably designed with a minimum number of LEDs to limit the power consumption. In particular, some CIS sensors use an array of LEDs in a line to illuminate the different pixel positions of the paper. However, by using an optical element, such as a light pipe, the light emitted by an LED can be directed to a number of pixel positions. In an optimum embodiment, a single LED can illuminate all the pixel positions for a particular color LED. Preferably, three LEDs are used, with the preferred colors being blue, green, and red/orange. An example of the use of such a light pipe is set forth in a copending application of the same assignee, entitled "Color Scanner Using Both Variable LED Exposure Time And Photodetector Output Compensation", filed Jun. 30, 1995, Ser. No. 08/497,459, hereby incorporated herein by reference. In addition, Mitsubishi has recently introduced a CIS sensor using a single LED for each color. While some CIS sensors use 10–12 volts for the LEDs, the Mitsubishi design uses a 5 volt supply.

Figure 6:
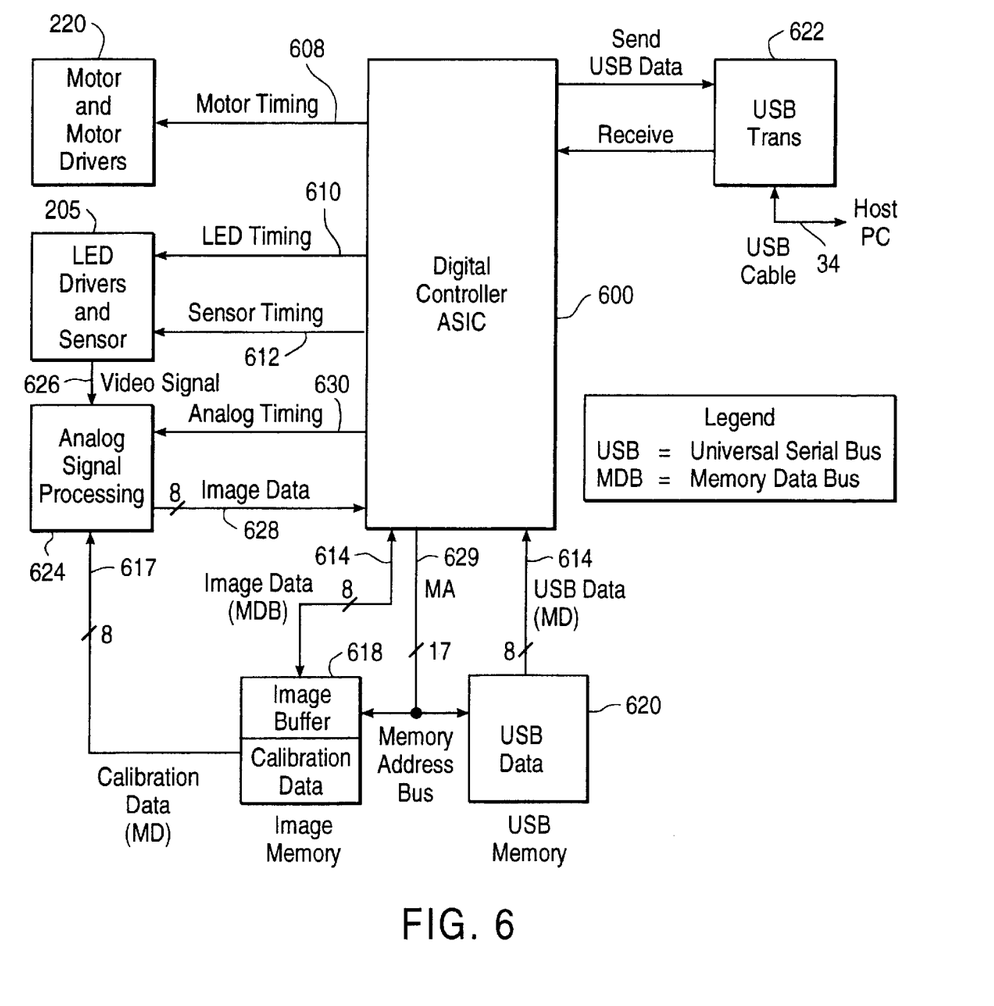
FIG. 6 is a block diagram of the electronic control circuitry of the present invention.

FIG. 6 is a block diagram of the electronic control circuitry for the present invention. In a preferred embodiment, an ASIC chip 600 has the custom circuitry for providing the processing functions of the invention. In particular, ASIC 600 includes analog control, a data manager, and a host interface. The analog control provides a motor control signal on lines 608 to motor and motor drivers 220. In addition, LED timing signals on lines 610 and CIS timing signals on lines 612 are provided to LED drivers and CIS sensor 205.

ASIC 600 interfaces over an image data bus 614 to a calibration data and image FIFO memory 618, and over data bus 614 to a USB descriptor memory 620. ASIC 600 interfaces with a USB transceiver 622, which in turn interfaces with the USB connector 34 connected to the host computer.

In addition, an analog signal processor 624 receives an analog video signal output from the sensor on lines 626 and provides the image data on a bus 628 to ASIC 600, which can then store the data in memory 618. Timing signals from ASIC 600 are provided on lines 630 to an ADC 616 in analog processor 624 (see FIG. 8).

As each pixel is read from the CIS sensor, calibration data from memory 618 is loaded over a calibration data bus 617 into analog processor 624. In particular, minimum and maximum values to correct for differences in the intensity of light at different colors provided to each pixel position are provided. Such calibration is described in more detail in the above-referenced copending application Ser. No. 08/497,459. As described in the same application, the ASIC 600 controls the LED and CIS timing to provide more power to the blue LEDs, for example, to compensate for differences in intensity at the same power. In addition, lesser power is provided to the higher intensity red/orange LED to limit wasted power. This is described in more detail in the application Ser. No. 08/497,459.

USB transceiver 622 is preferably a driver manufactured by Philips which operates on 3.3 volts. USB descriptor memory 620 stores the descriptors which would be requested by the host pursuant to the USB interface description in order to describe the peripheral.

The circuitry of FIG. 6 is designed to match the 12 MHz speed of the USB. 12 MHz is a relatively slow speed compared to internal switching times of integrated circuits, including integrated circuits designed to operate at 3.3 volts. Since faster switching speeds require more power, the design of this circuitry purposely uses slower switching speed devices to further limit the power consumption. Thus, a low end, lower speed ASIC can be used, such as Part No. KG 7763, made by Samsung.

Figure 7:
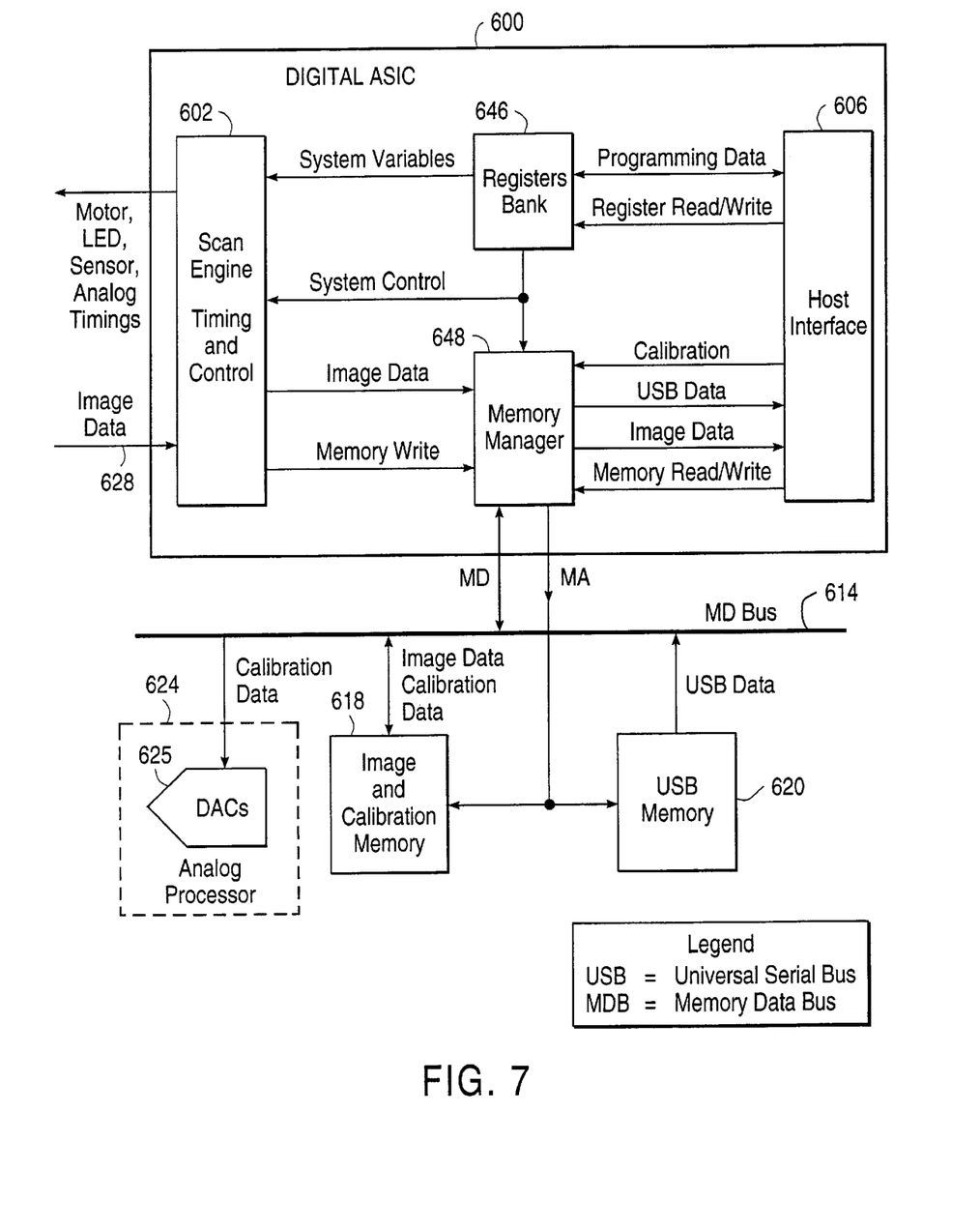
FIG. 7 is a block diagram showing the ASIC of FIG. 6 in more detail.

FIG. 7 illustrates an internal organization of ASIC 600 in more detail. A register bank 646 includes data, control, and command registers. Memory manager circuit 648 is connected to a host interface 606 and a scan engine timing and control block 602, as well as the memories over data bus 614. Memory 618 includes both calibration and image data. As discussed above, the calibration information is used to calibrate an image data analog-to-digital converter 616 in processor 624 (see FIG. 8), with its associated minimum and maximum value DACs 625. The image memory stores the image scan before transmission through the memory manager and the host interface to the host computer. Typically, the scanning speed is related to the available memory space in the image memory in memory 618. If the memory gets close to full, the scanning speed is slowed down and vice versa.

Figure 8:
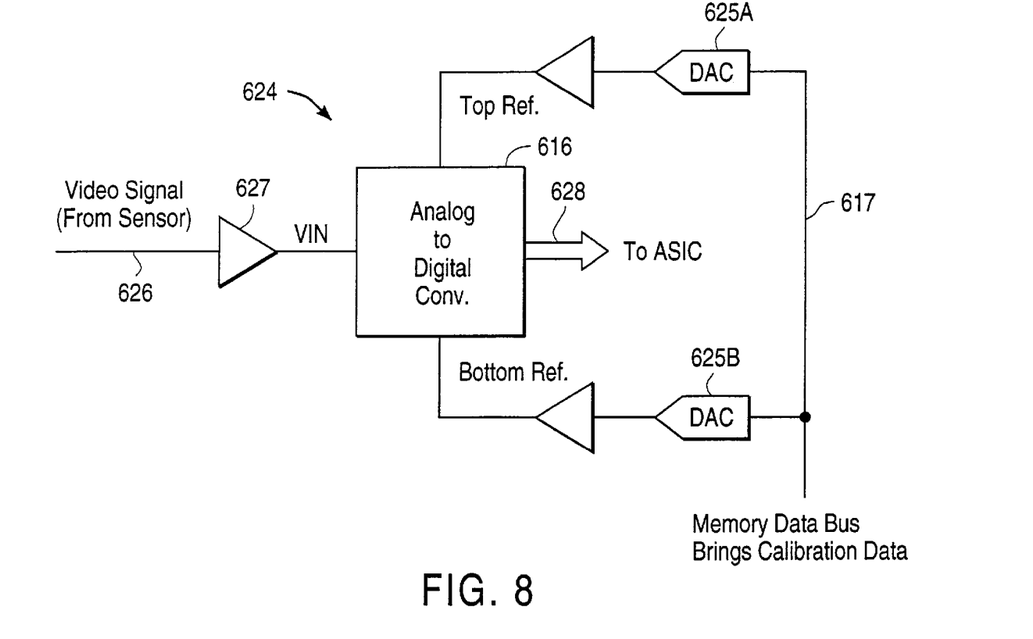
FIG. 8 is a block diagram of the analog signal processor of FIG. 6.

FIG. 8 is a block diagram of the analog signal processor 624 of FIG. 6. As shown, the video signal on lines 626 is provided through an amplifier 627 to analog-to-digital converter 616. From there, digital data is provided over image data bus 628 to ASIC 600. Calibration data on bus 617 is provided to DACs 625A and 625B. These set the minimum and maximum of ADC 616. In one embodiment, memory buses 614, 617 and 628 could all be the same memory bus, with a common address bus 629 (as shown in FIG. 6) determining where the data is being transmitted.

Figure 9:
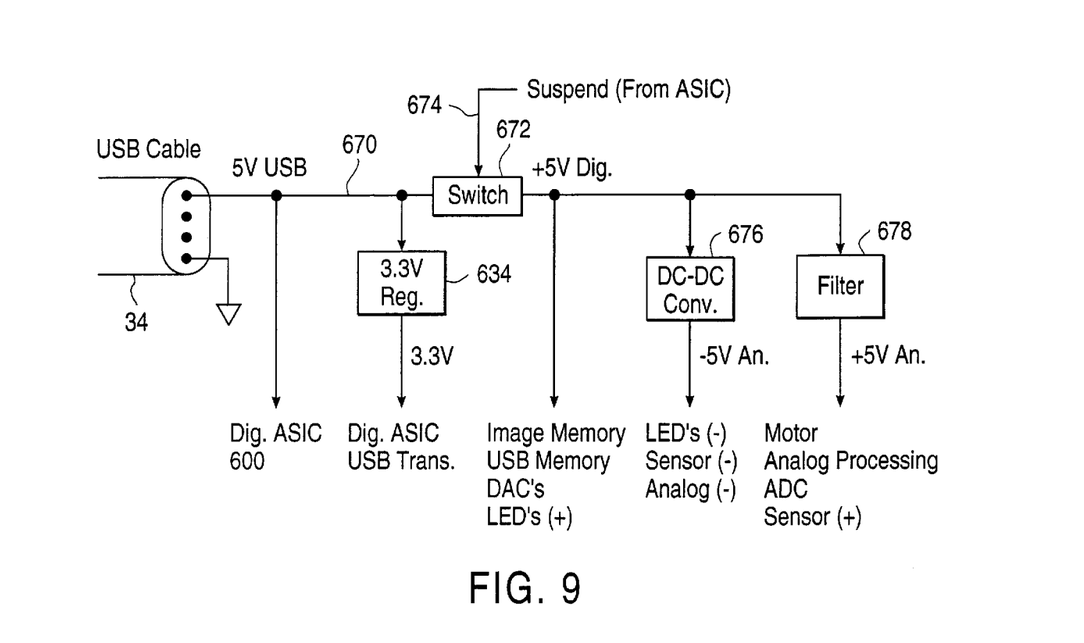
FIG. 9 is a block diagram of the power supply system.

FIG. 9 illustrates the power distribution of the present invention. Five volt power is provided on line 670 from USB cable 34. This power is provided directly to certain circuitry of digital ASIC 600. A voltage regulator 634 generates 3.3 volts for most of the digital ASIC 600, and also for the USB transceiver circuit 622. A switch 672 is used to suspend power to the remaining circuitry under the control of a suspend signal on line 674 from ASIC 600. The voltage which can be suspended is provided directly from switch 672 to the image memory, USB memory, DACs and LEDs. A voltage converter 676 converts the 5 volts into a negative 5 volts which is needed by the LEDs, the CIS sensor, and analog processing circuit 624. Finally, a filter 678 provides the necessary filtered signal needed by the motor itself, as well as the positive 5 volts needed by the analog processing circuit 624, ADC 616 and the CIS sensor.

Voltage regulator 634 provides 3.3 volts to most of the control circuitry. A 3.3 volt level can still be provided when the power slips to 4.5 volts. The USB is specified to have the power between 4.5 and 5.5 volts. Thus, the circuitry must be able to deal with this uncertain amount of exact power being provided from the host computer.

In a preferred embodiment, a new method for determining the motor speed is used. In prior art scanners, the midway or some other threshold point of the image buffer or memory was used, with the motor being accelerated when the image buffer was less than the threshold, and being decelerated when it was more than the threshold, with the threshold position being the triggering point. Pursuant to this invention, a more optimum method of calculating the speed, which would use less power, was desired. It was determined that a result-oriented approach drove a design which was effective, yet simple, requiring few components and less power. In particular, the speed is simply a linear function of the emptiness of the image memory.

As the Data Mgr in the ASIC keeps track of the amount of data kept in image memory, the simple binary inversion of an already available parameter provides the maximum value for the speed calculation circuitry. Since the host computer reads the data in small packets, the image buffer emptiness variable changes smoothly and it becomes in effect the speed yielded by the hardware loop.

The speed value is then used to regulate the frequency of the predefined motor waveforms: short periods or high frequency for high speeds and long periods for low speeds. The motor inductor currents have a shape that looks like something between a square wave and a sinewave. These waves are generated by "microstepping" a method of changing currents a little at each step, thus assuring a smooth motor operation.

This scanner has only 128 microsteps for a full wave period. Such a low number is possible because the motor currents are generated by an external voltage to current driver. The voltages to the motor driver are generated by an RC filter that smoothes two ASIC digital signals with the duty cycle proportional to the desired external voltage (i.e. 4.2 volt (84% of 5 volt) is obtained by a signal=5 volt 84% of the time).

The present invention is dynamically responsive to the USB bandwidth. This bandwidth is not constant, and depends upon what other peripherals are connected to the USB, and their usage of the USB. The FIFO memory provides data to the host computer as bandwidth is available, the scan engine controls the scanning speed in response to the amount of data in the FIFO memory.

The present invention takes advantage of this characteristic, and can simplify calculations and reduce the number of bits required for certain control information. For example, instead of specifying 16-bits for the speed value of the motor, only the nine most significant bits need be used to provide rough accuracy. Because the motor is adjusted relative to the amount of data in the FIFO, this provides feedback which will adjust quickly for any inaccuracy in the specification of the motor speed. In addition, the USB protocol calls for data to be sent in packets of 64 bytes. Accordingly, there is no need to determine whether the FIFO memory is some value under 64 bytes, but merely if it exceeds 64 bytes so there is enough data for a packet. Accordingly, less resolution is needed for this purpose in determining the fullness of the FIFO memory. In the present invention, 1K byte is used as the minimum accuracy so that a significant number of packets can be filled before a transmission is initiated. The significance of the reduced number of bits for the different types of control information is the reduction of additional circuitry and power consumption necessary to process the additional bits.

The Data Mgr has write and read pointer (128K=17 bits) in order to use the memory as a FIFO. In order to save circuitry it only computes FIFO status in 8 bits. The accuracy of this information is reduced to 1K, but this has no effect on either communication with the host or motor control.

In a preferred embodiment, only 128K bytes of memory are required to support the present invention.

The capability of the architecture to predefine the video output range through the DACs allows more power savings. As the DACs output set the minimum and maximum value for the video input to the ADC, the use of the extreme binary values 00 and FF will translate into the maximum video range of 0 to 2.5 volts. During calibration, the LEDs on time will be adjusted to match this voltage range. As the binary range is reduced (from FF to F0, E0 etc.), the calibration procedure will be forced to reduce the LED on-time in order to reduce the video output and in order to not saturate the ADC. This will result in power saving. As the binary number is further reduced image quality may be affected.

The architecture provides the ability to tune up the video range for the minimum power consumption that still meets image quality specifications. By maintaining a sufficient signal to noise ratio, image quality is not degraded.

Figure 10:
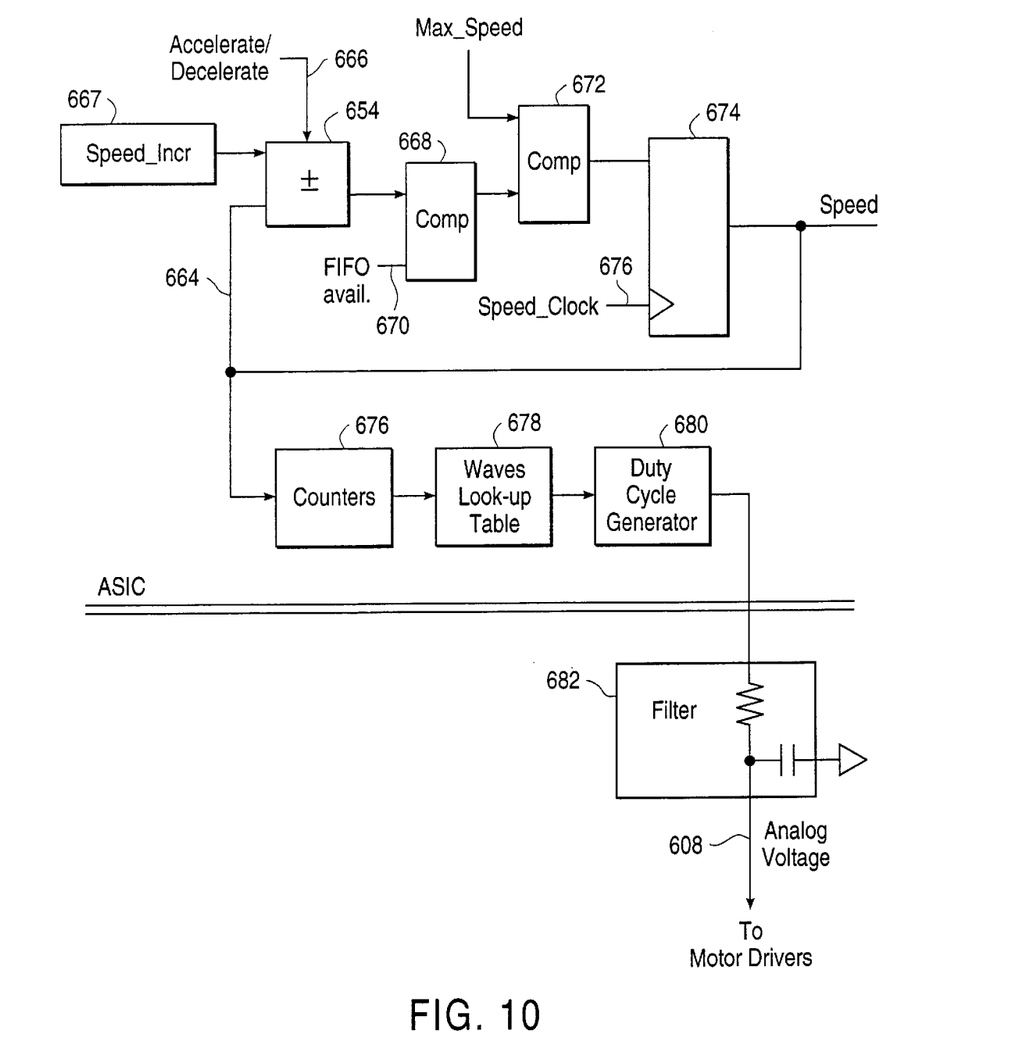
FIG. 10 is a block diagram of the motor speed control DAC replacement circuit.

In addition, a simplified circuit for producing the analog motor control signal is provided, as illustrated in FIG. 10. An adder/subtractor 654 combines a speed increment value from a register 662 with a speed value on lines 664. This speed increment value can be set depending on what size steps are desired. Preferably, a range from 0 to 2.55 is provided. In one mode of operation, an accelerate/decelerate signal on lines 666 control adder/subtractor 654. This signal can be determined by when the FIFO buffer passes a threshold.

Alternately, a comparator 668 is used to compare the output of adder/subtractor 654 with a FIFO available signal on lines 670. The FIFO available signal could indicate simply the emptiness of the image buffer, as discussed above. A second comparator 672 limits the speed to a maximum specified speed. Finally, the speed value is clocked through a gate 674 by a speed clock 676. In one embodiment, a speed clock has two programmable values, of every 2.6 or 0.66 milliseconds.

The speed signal on line 664 is provided to a counter 676 which is essentially a microstep generator. The output is provided to a lookup table 678, to select a sinewave value. This is then provided to a duty cycle generator 680, which is a counter that provides a signal having a duty cycle which is high for an amount of time corresponding to the sinewave digital value from lookup table 678. Finally, this signal is provided to a filter 682 and to the voltage control line 608.

Adder/subtractor 654 can be implemented as a 2's complement adder. This simplifies the circuitry needed for the subtraction operation. In addition, the 2's complement adder need not be completely accurate, providing additional simplification. In particular, 2's complement is typically done by inverting the number to be subtracted, giving its complement, and adding 1 to it. However, the 1 can be ignored since the result will only be off a single bit, and will be compensated for by feedback, as discussed above. Thus, the subtractor circuitry is simplified, requiring less transistors and less power consumption.

In addition to the minimum and maximum DAC calibration information, software adjustments of the image signal received are done. In particular, since a low power CIS sensor using only a single LED for a whole line of pixels is used, there are additional artifacts which are not found in traditional CIS sensors using an array of LEDs and requiring much higher power. These additional artifacts require additional compensation in the form of software adjustments.

As will be understood by those of skill in the art, the present invention may be embodied in other specific forms without departing from the spirit or essential characteristics thereof. For example, the invention can work with any low power source, not just a low power peripheral bus. The invention could work with a battery powered unit, for example. Accordingly, the foregoing description is intended to be illustrative, but not limiting, of the scope of the invention as set forth in the following claims.

What is claimed is:

1. A scanner comprising:
    a contact image sensor (CIS) having
    at least one light emitter for each of a plurality of colors, and
    an optical element for dispersing light from each said light emitter to a plurality of pixel positions, such that a plurality of pixel positions are illuminated by a single light emitter;
    a platen mounted opposite said CIS sensor, said platen including an outer material having a durometer hardness of at least 75 DUA and a coefficient of friction against paper of less than 0.9, and said platen having a diameter of no greater than 15 mm;

an electric motor for driving said platen, said motor having rare earth magnets;

a non-enveloping worm drive coupling said electric motor to said platen at a first end of said platen;

a control circuit for said scanner including
 a sensor drive circuit configured to provide different levels of power, for different amounts of time, to said light emitters,
 a motor drive circuit configured to provide a desired voltage level by varying the duty cycle of a series of digital pulses, and
 a motor speed circuit configured to determine a motor speed signal for said motor drive circuit using only a portion of the most significant bits of a digital motor speed control code, a digital controller circuit having a 3.3 volt power supply; and a voltage converter circuit for converting a 5 volt supply voltage to said 3.3 volt power supply.

2. A scanner comprising:

a contact image sensor (CIS) having at least one light emitter for each of a plurality of colors, an optical element for dispersing light from each said light emitter to a plurality of pixel positions, such that a plurality of pixel positions are illuminated by a single light emitter;

a platen mounted opposite said CIS sensor;

an electric motor for driving said platen, said motor having rare earth magnets; and a non-enveloping worm drive coupling said electric motor to said platen at a first end of said platen.

3. The scanner of claim 2 further comprising:

a control circuit for said scanner including
 a sensor drive circuit configured to provide different levels of power, for different amounts of time, to said light emitters,
 a motor drive circuit configured to provide a desired voltage level by varying the duty cycle of a series of digital pulses, and
 a motor speed circuit configured to determine a motor speed signal for said motor drive circuit using only a portion of the most significant bits of a digital motor speed control code,
 a digital controller circuit having a 3.3 volt power supply.

4. The scanner of claim 3 further comprising a voltage converter circuit for converting a 5 volt supply voltage to said 3.3 volt power supply.

5. The scanner of claim 4 wherein said 5 volt power supply is between 4.5 and 5.5 volts and is provided from a bus connection to a host computer, said bus connection providing less than 3 watts of power.

6. The scanner of claim 2 wherein said platen comprises:

an outer material having a durometer hardness of at least 75 DUA and a coefficient of friction against paper of less than 0.9;

said platen having a diameter of no greater than 15 mm.

7. The scanner of claim 2 wherein a single of said light emitters are used for each of three colors, said light emitters being LEDs.

8. The scanner of claim 7 wherein said colors are blue, green, and reddish orange, and one of said LEDs is provided more power and activation time than the others of said LEDs.

9. The scanner of claim 2 further comprising first and second springs for biasing said platen against said CIS sensor.

10. The scanner of claim 9 further comprising a plastic bearing mounted between each of said springs and an axle of said platen.

11. The scanner of claim 2 wherein said worm drive includes a helical thread coupled to a shaft of said motor; and a gear mounted on an axle of said platen;

wherein said helical thread is configured to have a single point of contact with said gear.

12. The scanner of claim 2 further comprising an activation switch mounted to detect the insertion of a sheet of paper into said scanner, said switch being mounted proximate a center of said platen.

13. A scanner comprising:

a contact image sensor (CIS) having at least one light emitter for each of a plurality of colors, an optical element for dispersing light from each said light emitter to a plurality of pixel positions, such that a plurality of pixel positions are illuminated by a single light emitter;

a platen mounted opposite said CIS sensor;

an electric motor for driving said platen, said motor having rare earth magnets;

a motor drive circuit coupled to said electric motor;

a motor speed circuit configured to determine a motor speed signal for said motor drive circuit using only a portion of the most significant bits of a digital motor speed control code; and a digital controller circuit having a 3.3 volt power supply.

14. The scanner of claim 13 further comprising:

a memory for holding image data from said CIS sensor;

a data bus for coupling to a host computer; and a control circuit for monitoring an amount of data in said memory, said control circuit using only the significant bits greater than the minimum packet size for said data bus.

15. The scanner of claim 13 further comprising:

a memory monitoring circuit configured to provide a memory level signal corresponding to the amount of room in said memory for more data; and said motor speed circuit being configured to provide said memory level signal as a motor speed signal for said motor drive circuit.

16. A scanner comprising:

a sensor having at least one light emitter for each of a plurality of colors and a detector;

a platen mounted opposite said sensor:

an electric motor for driving said platen;

a motor drive circuit coupled to said electric motor:

a memory for storing data from said sensor;

a memory monitoring circuit configured to provide a memory level signal corresponding to the amount of room in said memory for more data; and a motor speed circuit configured to provide said memory level signal as a motor speed signal for said motor drive circuit;

a data bus for coupling to a host computer; and wherein said memory monitoring circuit uses only the significant bits greater than the minimum packet size for said data bus.

* * * * *